United States Patent Office 3,325,513
Patented June 13, 1967

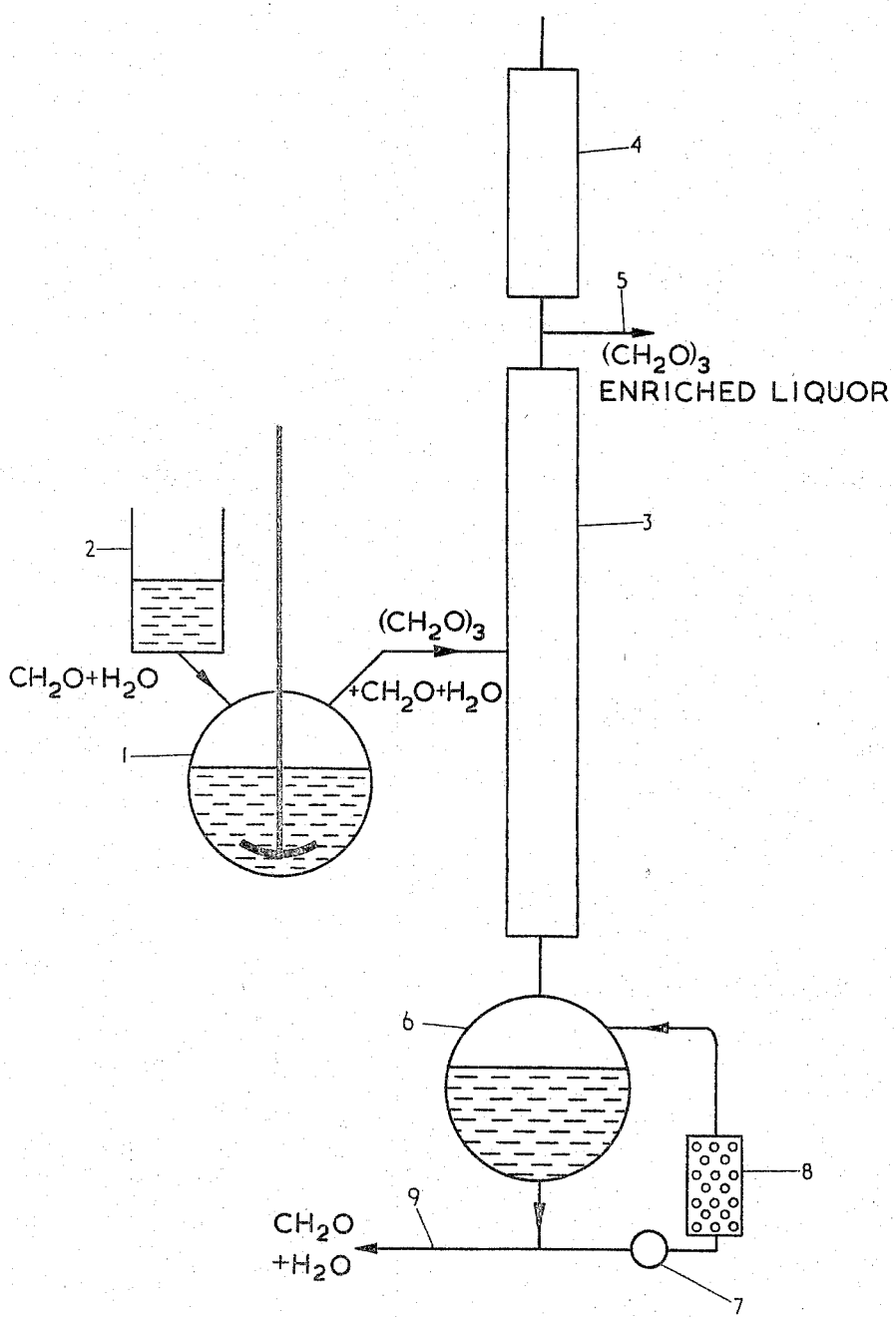

3,325,513
PRODUCTION OF TRIOXANE
William Randall Bamford, West Kilbride, Scotland, assignor to Imperial Chemical Industries Limited, London, England, a corporation of Great Britain
Filed Nov. 12, 1964, Ser. No. 410,392
Claims priority, application Great Britain, Dec. 5, 1963, 48,097/63
3 Claims. (Cl. 260—340)

This invention relates to an improved process for producing trioxane from formaldehyde and to apparatus suitable for carrying out the process.

Trioxane is formed by treating formaldehyde with strong acids which catalyse the formation of an equilibrium mixture of formaldehyde and trioxane

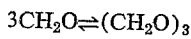

$$3CH_2O \rightleftharpoons (CH_2O)_3$$

Suitable strong acids are sulphuric, phosphoric and hydrochloric acids and acidic ion-exchange resins such as polystyrene substituted with sulphonic acid groups.

The process generally used for trioxane production comprises heating aqueous formaldehyde in the presence of a strong acid, so as to evaporate a gaseous mixture of formaldehyde, trioxane and water, leading the evaporated mixture to a distillation system consisting of a reboiler and a fractionating column, and collecting the trioxane-rich fraction from the top of the fractionating column. The process is conveniently carried out in a continuous manner, aqueous formaldehyde being fed continuously to the reaction vessel and a more dilute solution, containing unconverted formaldehyde, being continuously withdrawn from the reboiler.

We have now found that the proportion of formaldehyde converted to trioxane, and consequently the yield from a plant of any given formaldehyde throughput, can be substantially increased if the liquid condensate in the fractionating column is contacted with acid catalyst. This has the effect of adding a second reaction stage to the process.

Thus, according to the present invention an improved process comprises forming an aqueous equilibrium mixture of formaldehyde and trioxane, evaporating from said mixture a mixture of trioxane, formaldehyde and water, introducing said evaporated mixture, in either a vapour or condensed phase, into a fractionating system in which a trioxane-rich fraction collects at the top and a formaldehyde-rich fraction collects at the bottom, contacting the formaldehyde-rich fraction from the fractionating system with an effective catalyst (as hereinafter defined) and removing the trioxane-rich fraction from the system.

By "effective catalyst" we mean a catalyst effective in establishing the equilibrium mixture of formaldehyde and trioxane.

The catalyst is conveniently in the reboiler system and is advantageously one which is insoluble in the reaction medium, so that none of it need be withdrawn from the reboiler with the formaldehyde solution which is continuously withdrawn from the reboiler when the process is carried out in a continuous manner. The withdrawn formaldehyde solution may, therefore, be concentrated or fortified and reused in the process. Suitable insoluble catalysts include the aforementioned acidic ion-exchange resins. Effective resins are commercially available under the names Amberlite IR–120 and IR–200, Zeo-Karb 225, Dowex 50, Duolite C–20, Dow Catalyst 810 and Nalcite HCR. The catalyst may be stirred with the condensate from the fractionating system or the condensate may be circulated through a static mass of catalyst.

Apparatus suitable for carrying out the process of the invention includes a first reaction vessel, having a feed inlet and an outlet for gaseous products, and a distillation apparatus connected to said outlet, which distillation apparatus comprises a fractionating column and a second reaction vessel connected therewith so as to function as the reboiler for the fractionating column.

Since the proportion of formaldehyde converted to trioxane is dependent on the degree of equilibrium reached in the reaction medium, which in turn depends on the time of dwell of the reaction medium in the reaction vessel, it is apparent that the degree of conversion to trioxane will increase with increase in size of the reaction vessel and with a decrease in the rate of formaldehyde throughput. For a given size of reaction vessel, however, decrease in throughput rate decreases the total production and we have found that when using 60 percent formaldehyde it is best to operate the process so that the average dwell in the reaction vessel is about 10 hours. The second reaction vessel of the apparatus of the invention should therefore be approximately the same size as the first and preferably the size of both reaction vessels and the feed and take-off rates used in the process should be such that average dwell time is approximately 10 hours.

The invention is further illustrated by the following description of a preferred process in which reference is made to the accompanying schematic diagram of apparatus for carrying the process into effect. In the description all percentages are by weight.

In the process, a stirred vessel 1, containing 60 percent formalin and an acid catalyst, is heated sufficiently to distill off a mixture of trioxane, water and formaldehyde at the rate of about 10 percent of the formalin content per hour. Fresh 60 percent formalin is constantly metered into the reactor from a heated storage vessel 2 to maintain a constant charge in the vessel 1. The vapours are passed into a fractionating column 3, fitted with a reflux condenser 4. Trioxane-enriched liquors are removed at outlet 5 for isolation of the trioxane by known procedures. Much of the water and formaldehyde is returned as liquid to a reaction vessel 6 which is the reboiler for the fractionating column 3. The vessel 6 contains 40–50 percent formalin which is continuously circulated by means of a pump 7 through a heated chamber 8 containing a bed of solid, strongly acidic catalyst. A portion of the liquor is continuously withdrawn at outlet 9 to maintain a constant charge in the vessel 6. This portion is subsequently reconverted to 60 percent formalin for recycle.

The practice of the aforedescribed preferred process is illustrated by the following specific examples in which all parts and percentages are by weight.

*Example 1*

A charge of 1500 parts of 60 percent formalin and 75 parts concentrated sulphuric acid was heated in the reaction vessel 1 to evolve vapour at the rate of 150 parts per hour. The vessel 6 contained 853 parts of 46.5 percent formalin and the chamber 8 contained 90 parts of Amberlite IR–120 resin. 80 parts of distillate containing 48 parts trioxane and 9.8 parts of formaldehyde were removed from the top of the fractionating column 3 every hour. Simultaneously 70 parts per hour of liquid containing 44.7 percent formaldehyde and 1.8 percent trioxane were removed from the vessel 6.

When the process was carried out without using the resin, only 38 parts of trioxane per hour were obtained. Thus, the proportion of formaldehyde converted to trioxane was increased from 42 percent to 53 percent by employing the process of the invention.

*Example 2*

In this example the charge in vessel 1 and the rate of evolution therefrom were the same as in Example 1.

The vessel 6 contained 1,443 parts of 42 percent formalin and 150 parts Dow Catalyst 810. 104.4 parts per hour of distillate containing 52.2 parts trioxane and 18.8 parts formaldehyde were removed from the top of the fractionating column 3. 45.6 parts per hour of solution were removed from the vessel 6 and were found to contain 18.4 parts formaldehyde and 0.7 part trioxane.

By carrying out the process in accordance with the invention, the conversion of formaldehyde to trioxane was increased from 42 percent to 58 percent.

*Example 3*

A charge of 1,500 parts of 60.5 percent formalin and 150 parts of Amberlite IR–120 was heated in the reaction vessel 1 to evolve vapour at the rate of 150 parts per hour and the charge weight in vessel 1 was maintained by the addition of 60.5 percent formalin at the same rate. The vessel 6 contained 1,428 parts of 44 percent formalin and 140 parts of Amberlite IR–120. 87.8 parts per hour of a distillate consisting of 52.7 parts trioxane, 10.5 parts formaldehyde and 24.6 parts water were removed from the top of the fractionating column 3 and 62.2 parts per hour of a liquor containing 42.3 percent formaldehyde and 1.7 percent trioxane were removed from the vessel 6. The trioxane yield corresponded to 58 percent of the formaldehyde compared to a yield of 42.5 percent obtained when the process is carried out without catalyst in the reboiler (vessel 6).

What I claim is:

1. A process for producing trioxane from formaldehyde which comprises heating aqueous formaldehyde in the presence of a catalyst known for the conversion of formaldehyde to trioxane in amounts sufficient to form an aqueous equilibrium mixture of formaldehyde and trioxane, evaporating from said mixture a vapor mixture of trioxane, formaldehyde and water, introducing said vapor mixture into a fractionating system comprising a reboiling zone, a fractionating zone and vapor exit zone, said vapor mixture being introduced at a point intermediate said reboiling zone and said vapor exit zone, fractionating said vapor mixture into a formaldehyde-rich fraction and a trioxane-rich fraction, contacting said formaldehyde rich fraction in said reboiling zone with an insoluble acidic ion exchange resin catalyst, and removing said trioxane-rich fraction from said vapor exit zone.

2. A process as claimed in claim 1 wherein the condensed formaldehyde-rich fraction from the fractionating system is circulated through a static mass of the catalyst.

3. A process as claimed in claim 1 wherein the reaction is carried out in a continuous manner and the formaldehyde feed rate is adjusted so that the average dwell time is approximately 10 hours.

References Cited

UNITED STATES PATENTS 3,176,023  3/1965  Yamase _____ 260—340

FOREIGN PATENTS 1,135,491  8/1962  Germany.

WALTER A. MODANCE, *Primary Examiner.*

N. S. MILESTONE, *Assistant Examiner.*